(12) United States Patent
Ichikawa et al.

(10) Patent No.: US 10,173,159 B2
(45) Date of Patent: Jan. 8, 2019

(54) MOLD-PREVENTING AIR FILTER FILTRATION MEDIUM AND MOLD-PREVENTING AIR FILTER

(71) Applicants: Fine Tech Co., Ltd., Tokyo (JP); NOF CORPORATION, Tokyo (JP); DAIKIN INDUSTRIES, LTD., Osaka (JP)

(72) Inventors: Yukimitsu Ichikawa, Tokyo (JP); Kanya Goto, Tokyo (JP); Narumi Dosaka, Tokyo (JP); Yumiko Fukushima, Tokyo (JP); Yasuhito Fujimaki, Tokyo (JP); Satoshi Yamada, Ibaraki (JP); Osamu Tanaka, Osaka (JP)

(73) Assignees: Fine Tech Co., Ltd., Tokyo (JP); NOF CORPORATION, Tokyo (JP); DAIKIN INDUSTRIES, LTD., Osaka (JP)

( * ) Notice: Subject to any disclaimer, the term of this patent is extended or adjusted under 35 U.S.C. 154(b) by 103 days.

(21) Appl. No.: 14/378,391

(22) PCT Filed: Feb. 12, 2013

(86) PCT No.: PCT/JP2013/053213
§ 371 (c)(1),
(2) Date: Nov. 17, 2014

(87) PCT Pub. No.: WO2013/122035
PCT Pub. Date: Aug. 22, 2013

(65) Prior Publication Data
US 2015/0107203 A1    Apr. 23, 2015

(30) Foreign Application Priority Data
Feb. 17, 2012 (JP) .................. 2012-032251

(51) Int. Cl.
*B01D 46/00* (2006.01)
*B01D 39/16* (2006.01)
(Continued)

(52) U.S. Cl.
CPC ....... *B01D 39/163* (2013.01); *B01D 46/0005* (2013.01); *B01D 46/521* (2013.01);
(Continued)

(58) Field of Classification Search
CPC ...... B01D 46/05; B01D 46/28; B01D 46/521; D06M 15/267; D06M 15/3564
See application file for complete search history.

(56) References Cited

U.S. PATENT DOCUMENTS 6,933,252 B2 * 8/2005 Pierce ................ B01D 39/2024
442/327
8,486,428 B2 * 7/2013 Sun ........................ A01N 37/28
424/405
(Continued)

FOREIGN PATENT DOCUMENTS

JP    2-255804 A    10/1990
JP    H03146756 A    6/1991
(Continued)

OTHER PUBLICATIONS

International Search Report issued in PCT/JP2013/053213 dated May 21, 2013 (2 pages).
(Continued)

*Primary Examiner* — Christopher P Jones
(74) *Attorney, Agent, or Firm* — Osha Liang LLP (57) ABSTRACT

A mold-preventing air filter filtration medium loaded with a water-retaining macromolecule polymer, a mold-preventing agent, and a binder resin, is formed by immersing a filter material or a reinforcing nonwoven fabric (a backing material) in a mold-preventing composition in which the water-
(Continued)

retaining macromolecule polymer, the mold-preventing agent and the binder resin are dissolved, and drying the filter material or the reinforcing nonwoven fabric. The reinforcing nonwoven fabric (a backing material) may be bonded to a filter material to form a mold-preventing air filter filtration medium. A mold-preventing air filter includes the mold-preventing air filter filtration medium that is pleated and accommodated in a frame.

8 Claims, 2 Drawing Sheets

(51) Int. Cl.
    *D06M 15/267*     (2006.01)
    *D06M 13/352*     (2006.01)
    *D06M 13/355*     (2006.01)
    *D06M 15/263*     (2006.01)
    *D06M 15/356*     (2006.01)
    *D06M 16/00*     (2006.01)
    *B01D 46/52*     (2006.01)
    *C08F 220/34*     (2006.01)

(52) U.S. Cl.
CPC ........ *D06M 13/352* (2013.01); *D06M 13/355* (2013.01); *D06M 15/263* (2013.01); *D06M 15/267* (2013.01); *D06M 15/3564* (2013.01); *D06M 16/00* (2013.01); *B01D 46/0028* (2013.01); *B01D 2239/0442* (2013.01); *B01D 2239/065* (2013.01); *B01D 2239/0618* (2013.01); *C08F 220/34* (2013.01)

(56) References Cited

U.S. PATENT DOCUMENTS

| 2010/0062375 | A1* | 3/2010 | Inno | G03F 7/027 |
| | | | | 430/302 |
| 2014/0315779 | A1* | 10/2014 | Zander | D06M 15/267 |
| | | | | 510/527 |

FOREIGN PATENT DOCUMENTS

| JP | H04002850 A | | 1/1992 |
| JP | 05-060513 | * | 8/1993 |
| JP | 5-60513 U | | 8/1993 |
| JP | 8-333421 A | | 12/1996 |
| JP | 9-3132 A | | 1/1997 |
| JP | 10-000315 A | | 1/1998 |
| JP | 11-35605 A | | 2/1999 |
| JP | 2003-166155 A | | 6/2003 |
| JP | 2003-290613 A | | 10/2003 |
| JP | 2004-137382 A | | 5/2004 |
| JP | 2004-308938 A | | 11/2004 |
| JP | 2005-152793 A | | 6/2005 |
| JP | 2009-114237 A | | 5/2009 |
| JP | 2011-196638 A | | 10/2011 |
| JP | 2003166155 | * | 6/2013 |

OTHER PUBLICATIONS

"Antibacterial and mold-preventing technologies"; Toray Research Center, Inc., R & D, May 2004, vol. 1, p. 22 (9 pages).

Office Action issued in counterpart Japanese Patent Application No. 2013-558686, dated Jan. 11, 2017 (8 pages).

* cited by examiner

Inside the room

FIG. 4

MOLD-PREVENTING AIR FILTER FILTRATION MEDIUM AND MOLD-PREVENTING AIR FILTER

TECHNICAL FIELD

The present invention relates to a mold-preventing air filter which captures mold (fungi) and bacteria floating in the air, inhibits the growth of mold and bacteria captured, and reduces them to purify the air. More specifically, the present invention relates to an air filter filtration medium having a mold-preventing and antibacterial property, and a mold-preventing air filter produced by pleating the filtration medium and accommodating the same in a frame.

BACKGROUND ART

In recent years, contamination with mold and bacteria in hospitals and food factories has become a problem. Mold and bacteria grow significantly especially in the rainy season when humidity is high and condensation occurs. Therefore, walls and other parts in factories are coated with mold-preventing, antibacterial paint to inhibit the growth of mold and bacteria. Air conditioning equipment has an air filter which has been subjected to mold-preventing, antibacterial treatment, which captures dust, mold, and bacteria floating in the air to purify the air.

An air filter is made of a filter material such as glass fiber, paper, or nonwoven fabric, and the material is pleated to increase the filtration area and filtration property. A filter material having low rigidity such as melt blown nonwoven fabric, which has a poor pleat-retaining property. Therefore usually a filter material is bonded with a rigid nonwoven fabric for reinforcement and the bonded filter material is pleated.

For example, Patent Document 1 discloses a dust collecting filter (air cleaning filter) for an air conditioner, which is loaded with a mold-preventing agent, an antibacterial agent and an antiviral agent, wherein the mold-preventing agent includes an organic nitrogen-based compound, a sulfur-based compound, an organic acid ester, an organic iodine-based compound and an imidazole compound, and wherein tea extract may be used as the antibacterial and antiviral agents.

As in Patent Document 1, Patent Document 2 also discloses a dust collecting filter (air cleaning filter) for an air conditioner, which is loaded with a mold-preventing agent, an antibacterial agent, and an antiviral agent, wherein the mold-preventing agent includes an organic nitrogen-based compound, a sulfur-based compound, an organic acid ester, an organic iodine-based compound, an imidazole compound, a vegetable essential oil, a benzole compound and so on, and wherein a p-benzoquinone derivative from bamboo extract may be used as the antibacterial and antiviral agents.

However, conventionally and commonly used mold-preventing agents and antibacterial agents involve a problem that these agents cannot achieve their effects sufficiently when they are under dry condition.

Another problem with conventionally and commonly used mold-preventing agents or antibacterial agents is that long-term use of these agents may change mold and bacteria to wild-type microorganisms (fungi or bacteria) and bacteria having resistance to these agents, making these agents less effective. The mold-preventing agent includes an organic nitrogen-based compound, a sulfur-based compound, an organic acid ester, an organic iodine-based compound, an imidazole compound, and the antibacterial agent includes a silver-based compound, a zinc-based compound, an alcohol-based compound, a phenol-based compound, a quaternary ammonium salt, benzoates, hydrogen peroxide, cresol, chlorhexidine, Irgasan, aldehydes and sorbic acid.

PRIOR ART

Patent Literature

Patent Literature 1: Japanese Pre-Grant Publication of Patent Application No. H10-000315
Patent Literature 2: Japanese Pre-Grant Publication of Patent Application No. 2003-290613

DISCLOSURE OF THE INVENTION

Problems to be Solved by the Invention

The present invention has been made in view of the above-mentioned problems. An object of the present invention is to provide a mold-preventing air filter filtration medium and a mold-preventing air filter capable of imparting sufficient mold-preventing property to an air filter whose surface is often dry, and being effective against wild-type microorganisms.

Means for Solving the Problems

The inventors carried out intensive studies to solve the problems. As a result, it has been found that a mold-preventing air filter filtration medium having superior mold-preventing property even under dry condition can be obtained by loading a filter material with a water-retaining macromolecule polymer, a mold-preventing agent, and a binder resin, or loading a reinforcing nonwoven fabric (a backing material) with a water-retaining macromolecule polymer, a mold-preventing agent, and a binder resin and bonding the reinforcing nonwoven fabric to a filter material together. The present invention was accomplished on the basis of the founding.

The present invention is as follows.

(1) a mold-preventing air filter filtration medium characterized in that the filtration medium is loaded with a water-retaining macromolecule polymer, a mold-preventing agent and a binder resin;

(2) the mold-preventing air filter filtration medium as mentioned in (1), formed by bonding a reinforcing nonwoven fabric loaded with a water-retaining macromolecule polymer, a mold-preventing agent and a binder resin to a filter material together;

(3) the mold-preventing air filter filtration medium as mentioned in (1) or (2), wherein the solid weight ratio of the water-retaining macromolecule polymer and the mold-preventing agent is 1:10-500;

(4) the mold-preventing air filter filtration medium as mentioned in any one of (1) to (3), wherein the solid weight ratio of the mold-preventing agent and the binder resin is 1:0.5-10;

(5) the mold-preventing air filter filtration medium as mentioned in any one of (1) to (4), wherein the water-retaining macromolecule polymer is a polymer prepared by polymerization of a monomer composition comprising a phosphorylcholine-like group containing monomer represented by the following formula (1)

[Formula 1]

(1)

(wherein X represents a divalent organic residue, Y represents an alkyleneoxy group having 1-6 carbon atoms, Z represents a hydrogen atom or $R^5$—O—(C=O)— (wherein $R^5$ represents an alkyl group having 1-10 carbon atoms or a hydroxyalkyl group having 1-10 carbon atoms). $R^1$ represents a hydrogen atom or a methyl group, $R^2$, $R^3$, and $R^4$ are the same or different and represent a hydrogen atom or an alkyl or hydroxyalkyl group having 1-6 carbon atoms. m represents 0 or 1. n is an integer of 1-4.);

(6) the mold-preventing air filter filtration medium as mentioned in (5), wherein the polymer prepared by polymerization of a monomer composition comprising a phosphorylcholine-like group containing monomer is a polymer prepared by copolymerization of 2-(meth)acryloyloxyethyl-2'-(trimethylammonio)ethyl phosphate and a hydrophilic monomer having at least one hydrophilic group selected from the group consisting of hydroxy group, carboxyl group, phosphonic acid group, sulfonic acid group, amide group, amino group, dialkylamino group, trialkylamino base, trialkylphosphonium base, and polyoxyethylene group;

(7) the mold-preventing air filter filtration medium as mentioned in (6), wherein the hydrophilic monomer is a hydrophilic monomer having a trialkylamino base;

(8) the mold-preventing air filter filtration medium as mentioned in (7), wherein the hydrophilic monomer having a trialkylamino base is 2-hydroxy-3-(meth)acryloyloxypropyl trimethyl ammonium chloride;

(9) the mold-preventing air filter filtration medium as mentioned in any one of (1) to (8), wherein the binder resin is an acrylic resin; and (10) a mold-preventing air filter comprising a pleated filtration medium formed by pleating the mold-preventing air filter filtration medium as mentioned in any one of (1) to (9) and a frame for accommodating the pleated filtration medium.

Effects of the Invention

Because the mold-preventing air filter filtration medium and mold-preventing air filter of the present invention are loaded with a water-retaining macromolecule polymer and a mold-preventing agent, they achieve sufficient mold-preventing effect even under dry condition where the air filter is dried by the air flow during the operation of an air conditioner. The mold-preventing air filter filtration medium and mold-preventing air filter are effective against wild-type microorganisms having resistance to a mold-preventing agent which may occur when the air filter is used for a long time.

In addition, because a reinforcing nonwoven fabric (a backing material) is loaded with a binder resin, the binder resin can fix a mold-preventing agent stably, without being influenced by the type and shape of the fiber constituting the reinforcing nonwoven fabric (a backing material). The binder resin can prevent the mold-preventing agent from coming off even when the air flows during the operation of the air conditioner, which allows the mold-preventing air filter filtration medium and mold-preventing air filter of the present invention to achieve mold-preventing effect for a long time.

In the mold-preventing air filter filtration medium of the present invention, the phosphorylcholine-like group containing polymer in the mold-preventing composition has hydrophilic functional groups, i.e., the phosphorylcholine group and a hydrophilic functional group in the monomer which has been copolymerized. These hydrophilic functional groups have moisture absorption and water-retaining properties, and impart water-retaining property to the surface of the reinforcing nonwoven fabric (a backing material), which allows the component of the mold-preventing agent to be dissolved effectively and allows the air filter to achieve superior mold-preventing effect compared to the conventional mold-preventing agent-loaded filter without a water-retaining agent. In addition, the phosphorylcholine-like group containing polymer itself has a property which prevents the adhesion of mold and bacteria, and when used in combination with the mold-preventing agent, achieves higher mold-preventing property, and is effective against wild-type microorganisms having resistance to the mold-preventing agent.

MOST PREFERABLE EMBODIMENTS FOR CARRYING OUT THE INVENTION

The present invention is now described in detail hereinafter.

As used herein, "mold-preventing" refers to inhibition of the growth and reproduction of mold, especially to inhibition of the reproduction of mold on the surface of a product. As used herein, "antibacterial" refers to inhibition of the growth, and reproduction of bacteria, especially to inhibition of the reproduction of bacteria on the surface of a product.

A publication "Antibacterial and Mold-preventing Technologies" (published by Toray Research Center Inc., R&D, 2004, p. 22) was referred to for the definition of "mold-preventing" and "antibacterial."

The water-retaining macromolecule polymer for use in the present invention may be a known water-retaining macromolecule polymer, preferably is a polymer prepared by polymerizing a monomer composition comprising a phosphorylcholine-like group containing monomer (hereinafter referred to as "phosphorylcholine-like group containing polymer").

The phosphorylcholine-like group containing polymer is prepared by polymerizing a monomer composition comprising a phosphorylcholine-like group containing monomer represented by the above formula (1) and the polymer is a biocompatible material and has itself an ability to prevent the adhesion of bacteria and mold in addition to a water-retaining property.

In formula (1), X represents a divalent organic residue, Y represents an alkyleneoxy group having 1-6 carbon atoms, Z represents a hydrogen atom or $R^5$—O—(C=O)— (wherein $R^5$ represents an alkyl group having 1-10 carbon atoms or a hydroxyalkyl group having 1-10 carbon atoms).

$R^1$ represents a hydrogen atom or a methyl group, $R^2$, $R^3$, and $R^4$ are the same or different, and represents a hydrogen atom or an alkyl or hydroxyalkyl group having 1-6 carbon atoms. m represents 0 or 1. n is an integer of 1-4.

Specific examples of the phosphorylcholine-like group containing monomer include 2-(meth)acryloyloxyethyl-2'-(trimethyl ammonio)ethyl phosphate or 2-(meth)acryloyloxyethyl-3'-(trimethyl ammonio)propyl phosphate, 2-(meth)acryloyloxyethyl-4'-(trimethyl ammonio)butyl phosphate, 3-(meth)acryloyloxypropyl-2'-(trimethyl ammonio)ethyl phosphate, 2-(meth)acryloyloxyethyl-2'-(triethyl ammonio)ethyl phosphate.

Among these, 2-(meth)acryloyloxyethyl-2'-(trimethyl ammonio)ethyl phosphate is preferable and 2-(methacryloyloxy)ethyl-2'-(trimethyl ammonio)ethyl phosphate (abbreviated as MPC hereinafter) is more preferable in terms of availability.

The phosphorylcholine-like group containing polymer is preferably a copolymer of a phosphorylcholine-like group containing monomer represented by formula (1) and a hydrophilic monomer, more preferably a hydrophilic monomer having an ionic dissociative group.

The hydrophilic monomer is preferably a hydrophilic monomer having at least one hydrophilic group selected from the group consisting of hydroxy group, carboxyl group, phosphonic acid group, sulfonic acid group, amide group, amino group, dialkylamino group, trialkylamino base, trialkylphosphonium base, and polyoxyethylene group.

Specific examples of the hydrophilic monomer include, for example, (meth)acrylic acid, (meth)acrylamide, hydroxyethyl (meth)acrylate, dimethylaminoethyl (meth) acrylate, 2-(meth)acryloyloxyethyl trimethyl ammonium chloride, 2-hydroxy-3-(meth)acryloyloxypropyl trimethyl ammonium chloride, 2-acrylamide-2-methylpropane sulfonic acid, polyoxyethylene (meth)acrylate. Among these, a monomer having a trialkylamino base is preferred. 2-hydroxy-3-(meth)acryloyloxypropyl trimethyl ammonium chloride is preferable in terms of ease of copolymerization and 2-hydroxy-3-methacryloyloxy propyl trimethyl ammonium chloride (abbreviated as QMA) is more preferable in terms of availability.

Among the phosphorylcholine-like group containing polymer, a polymer prepared by polymerizing a monomer composition comprising 10-90 mol % of the phosphorylcholine-like group containing monomer represented by formula (1) and 10-90 mol % of a hydrophilic monomer may preferably be mentioned. More preferably, a polymer prepared by polymerizing a monomer composition comprising 50-90 mol % of the phosphorylcholine-like group containing monomer represented by formula (1) and 10-50 mol % of a hydrophilic monomer may be mentioned.

In order to increase the affinity for a binder resin, a hydrophobic monomer may be further copolymerized. Examples of the hydrophobic monomer include alkyl (meth) acrylates, styrene, vinyl acetate. The ratio of the hydrophobic monomer for copolymerization may be optionally selected within the range which the hydrophobic monomer does not impair the water-retaining property of the phosphorylcholine-like group containing polymer.

The phosphorylcholine-like group containing polymer has a weight average molecular weight of 100,000-2,000,000, preferably 300,000-1,000,000. With the weight average molecular weight being 100,000 or more, bleed out and loss of the mold-preventing agent can be prevented even when the mold-preventing air filter is used at high temperatures.

With the weight average molecular weight being 2,0000,000 or less, the phosphorylcholine-like group containing polymer is easily dissolved with the mold-preventing agent in a solvent to prepare a homogeneous solution of a mold-preventing composition.

The above-mentioned phosphorylcholine-like group containing polymer can be prepared by the known polymerization methods as described in Japanese Pre-Grant Patent Publication No. H09-3132, Japanese Pre-Grant Patent Publication No. H08-333421 and Japanese Pre-Grant Patent Publication No. H11-35605. The phosphorylcholine-like group containing polymer can be obtained by polymerizing raw materials, 2-(meth)acryloyloxyethyl-2'-(trimethyl ammonio)ethyl phosphate monomer and 2-hydroxy-3-methacryloyloxypropyl trimethyl ammonium chloride monomer in the presence of a polymerization initiator such as a commonly used radical polymerization initiator by a method such as bulk polymerization, emulsion polymerization, dispersion polymerization, and solution polymerization. Nevertheless, solution polymerization is desirable in terms of ease of control of molecular weight influenced by the heat of polymerization.

Any known mold-preventing agent may be used, for example, an organic nitrogen-based compound, a sulfur-based compound, an organic acid ester, an organic iodine-based compound and an imidazole compound. Although the mold-preventing agents may be used alone or in combination, a combination of two or more types of mold-preventing agents is preferable for higher inhibitory effect against growth of resistant microorganisms (fungi or bacteria).

The binder resin can be any binder resin, provided that the resin can be mixed with the phosphorylcholine-like group containing polymer and the mold-preventing agent uniformly, solid, powder, a resin emulsion, or a solution in a solvent. Use of the binder resin allows the reinforcing nonwoven fabric (a backing material) to be loaded with the mold-preventing agent effectively without being influenced by the type and shape of the fiber constituting the reinforcing nonwoven fabric.

Specific examples of the binder resin include acrylic resin, vinyl acetate resin, urethane resin, rubber-based elastomer and so on. Among these, acrylic resin is preferable because of superior liquid stability in a mold-preventing composition.

Examples of the acrylic resin include polymers or copolymers of (meth)acrylates such as polyethyl methacrylate, polybutyl methacrylate, butyl methacrylate/methyl methacrylate copolymer, butyl methacrylate/ethyl methacrylate copolymer, 2-ethylhexyl methacrylate/ethyl methacrylate copolymer, lauryl methacrylate/ethyl methacrylate copolymer. These acrylic resins may be used alone or in combination.

In the present invention, when a water-retaining macromolecule polymer, a mold-preventing agent, and a binder resin are used for loading, a mold-preventing composition comprising these components is preferably prepared first, and the composition is then used for loading.

The mold-preventing composition may further comprise an antibacterial agent, which can produce an antibacterial, mold-preventing air filter. Any known antibacterial agent may be used and examples include a silver-based compound, a zinc-based compound, an alcohol-based compound, a phenol-based compound, a quaternary ammonium salt, benzoates, chlorhexidine, sorbic acid, and so on.

The water-retaining macromolecule polymer and the mold-preventing agent are combined in the mold-preventing composition in a solid weight ratio of 1:10-500, preferably 1:50-400. If the ratio of the water-retaining macromolecule polymer and the mold-preventing agent is 10 or more, the water-retaining property of the water-retaining macromolecule polymer moisturizes the filter material and the reinforcing nonwoven fabric (a backing material) to allow the mold-preventing agent to achieve the mold-preventing effect. If the ratio is 500 or less, wasting of the mold-preventing agent can be prevented.

The mold-preventing agent and the binder resin are combined in the mold-preventing composition in a solid weight ratio of 1:0.5-10, preferably 1:0.5-4.0. If the ratio of the binder resin to the mold-preventing agent is 0.5 or more, the binder function of the binder resin fixes the water-retaining macromolecule polymer and the mold-preventing agent to the surface of the filter material or the reinforcing nonwoven fabric (a backing material) to prevent the mold-preventing agent from being dried by the air flow and causing loss of the effect. If the ratio is 10 or less, the binder resin does not cover the surface of the mold-preventing agent, so the mold-preventing effect is not impaired.

The mold-preventing air filter filtration medium of the present invention may be a filter material loaded with a mold-preventing composition or a filter material bonded to a reinforcing nonwoven fabric (a backing material) loaded with a mold-preventing composition. When a nonwoven fabric filter subjected to electrification (electretificated nonwoven fabric filter) is impregnated and loaded with a mold-preventing agent, the electret may be lost. Therefore, a reinforcing nonwoven fabric (a backing material) loaded with a mold-preventing agent is preferably bonded to the filter material.

The mold-preventing air filter filtration medium of the present invention is preferably prepared as follows. The above-mentioned water-retaining macromolecule polymer, mold-preventing agent and binder resin are dissolved in a solvent to prepare a mold-preventing composition having a solid concentration of 0.5-1.0 wt %. A filter material or a reinforcing nonwoven fabric (a backing material) is loaded with the mold-preventing composition by immersing the filter material or the reinforcing nonwoven fabric (a backing material) in the mold-preventing composition and drying. In preparing the mold-preventing composition, the mold-preventing composition is stirred at room temperature or with heating and mixed for an appropriate period of time until a homogeneous liquid is obtained. With the solid concentration being 0.5 wt % or more, the mold-preventing effect can be imparted. With the solid concentration being 10 wt % or less, the viscosity of the mold-preventing composition is not too high or the cost efficiency is not too low.

A filter material and a reinforcing nonwoven fabric (a backing material) may be immersed at room temperature, usually for one to ten seconds at 20-70° C., followed by air drying or preferably forced drying at around 150° C. to be loaded with the mold-preventing composition to the surface. Forced drying at around 150° C. allows the mold-preventing agent to adhere to the fiber more fixedly. The mold-preventing composition is preferably used such that a loaded amount is generally 0.1-10 g/m$^2$, preferably 1-5 g/m$^2$. If the loaded amount is too low, it may be difficult to obtain a mold-preventing air filter having sufficient mold-preventing effect. If the loaded amount is too high, the mold-preventing effect can be achieved but it may decrease the cost efficiency.

Examples of the solvent include water, methanol, ethanol, n-propanol, 2-propanol, n-butanol, glycerin, 1,3-butanediol, and a mixed solvent of two or more of these solvents, and a mixed solvent of at least one of these solvents and water and/or hexane. When water is used as the solvent, a small quantity of a surfactant may be added as a permeation agent. A mixed solvent of ethanol and water, a mixed solvent of 2-propanol and water, and a mixed solvent of water and a surfactant are preferable in terms of safety and workability.

Figure 1:
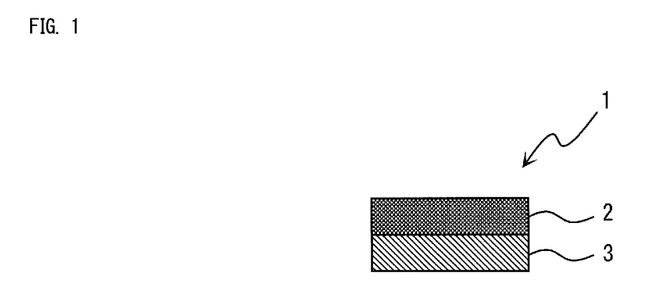
FIG. 1 is a schematic cross-sectional view of an embodiment of the mold-preventing air filter filtration medium of the present invention.

An example of a mold-preventing air filter filtration medium of the present invention is shown in FIG. 1, wherein a mold-preventing air filter filtration medium 1 was formed by bonding a reinforcing nonwoven fabric (a backing material) 2 which had been subjected to mold-preventing treatment and a filter material 3 together with an adhesive.

Figure 2:
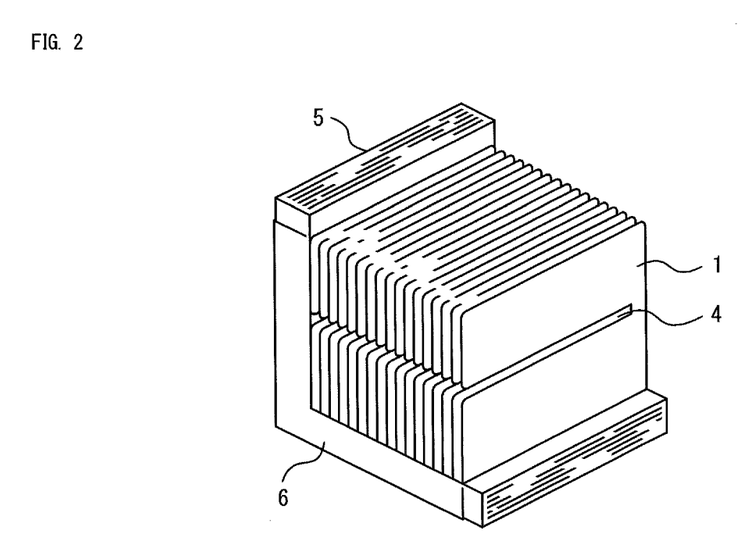
FIG. 2 is a view illustrating an exemplary configuration of a filter unit comprising the mold-preventing air filter of the present invention.

A view illustrating an exemplary configuration of a mold-preventing air filter is shown in FIG. 2, wherein a mold-preventing air filter filtration medium 1, formed by bonding a reinforcing nonwoven fabric (a backing material) 2 which had been subjected to mold-preventing treatment and a filter material 3 together, was pleated, tied with a string or a ribbon separator 4, and fixed in a frame body (frame) 5. 6 indicates a gasket.

When the mold-preventing air filter filtration medium 1 is fixed in the frame 5, the reinforcing nonwoven fabric (a backing material) 2 can be placed on the filtration medium facing upstream or downstream to the flow of the air to be filtered. The reinforcing nonwoven fabric 2 is preferably placed on the filtration medium facing upstream to the flow of the air to be filtered, because the reinforcing nonwoven fabric can capture dust, and thereby increasing the life of the mold-preventing air filter filtration medium 1.

Examples of the material for the reinforcing nonwoven fabric (a backing material) used in the present invention includes synthetic fiber such as polyamide-based fiber, polyester-based fiber, polyalkylene paraoxybenzoate-based fiber, polyurethane-based fiber, polyvinyl alcohol-based fiber, polyvinylidene chloride-based fiber, polyvinyl chloride-based fiber, polyacrylonitrile-based fiber, polyolefin-based fiber, phenol-based fiber, and rayon fiber, natural fiber such as wood pulp, hemp pulp, and cotton linter pulp, regenerated fiber, or blended fiber of these fibers, or fiber obtained by imparting a function such as hydrophilicity or flame retardance to any of these fibers.

A web is made from these fibers by dry method, wet forming method, melt blown method, spun bond method and the resulting web is entangled or bonded to form a reinforcing material by physical methods such as hydroentanglement method, needle punch method, and stitch bond method, bonding methods by heat such as thermal bonding method, or bonding methods by adhesive such as resin bond.

Examples of the material for the filter material include synthetic fiber such as polyolefin-based fiber, fluorofiber such as polytetrafluoroethylene fiber, polyamide-based fiber, polyester-based fiber, polyalkyleneparaoxybenzoate-based fiber, polyurethane-based fiber, polyvinyl alcohol-based fiber, polyvinylidene chloride-based fiber, polyvinyl chloride-based fiber, polyacrylonitrile-based fiber, phenol-based fiber, and rayon fiber, natural fiber such as wood pulp, hemp pulp, and cotton linter pulp, regenerated fiber, or blended fiber of these fibers, or fiber obtained by imparting a function such as hydrophilicity or flame retardance to any of these fibers. Among these, a melt blown nonwoven fabric of polypropylene is suitably used and the polypropylene fiber may be an electret having electric charge permanently.

A web is made from these fibers mentioned above by dry method, wet forming method, melt blown method, spun bond method and the resulting web is entangled or bonded to form a filter material by physical methods such as hydroentanglement method, needle punch method, and stitch bond method, bonding methods by heat such as thermal bonding method, or bonding methods by adhesive such as resin bond. For a fluorofiber such as polytetrafluoroethylene fiber, melt-spun fiber or emulsion-spun fiber is suitably stretched with heating. The filter material may be an electret filter obtained by subjecting a nonwoven fabric to electrification.

Air filters, which filter the air to clean the air, are classified into coarse dust air filter, medium performance air filter, HEPA filter and ULPA filter, depending on the diameter of the particles to be captured and the collection efficiency. The mold-preventing air filter of the present invention is especially suitable for medium performance air filter.

The mold-preventing air filter of the present invention, whether it is used as coarse dust air filter, medium performance air filter, HEPA filter, or ULPA filter, is suitably used for the structure where a filter material is pleated and fixed to a frame material by a sealing agent as the conventional shape. The filter material may be fixed to a frame material without pleating. Examples of the frame material include aluminum, wood, resin, and paper. A sealing agent such as polyurethane resin, epoxy resin, hot melt resin may be used for fixing a frame material and a filter material, or they may be joined with a bolt.

The reinforcing nonwoven fabric (a backing material) and the filtration medium may be bonded by scattering a powder resin such as ethylene vinyl alcohol between the reinforcing nonwoven fabric (a backing material) and the filtration medium and applying heat to fuse the resin or by using a one-pack type polyurethane as an adhesive to bond the reinforcing nonwoven fabric (a backing material) and the filtration medium together.

EXAMPLES

The present invention is described in further detail with reference to Examples, but the invention is not intended to be limited to Examples.
(Analysis Method of Molecular Weight of Polymer)

The polymers were analyzed by gel permeation chromatography (GPC) using phosphate buffer (pH 7.4, 20 mM) as an eluent with UV (210 nm) and refractive index detection to determine the weight average molecular weight using polyethylene glycol as a standard.

(Synthetic Example 1) (MPC1: MPC0.3-QMA0.7)

2-(Methacryloyloxy)ethyl-2'-(trimethylammonio)ethyl phosphate (MPC) (9.9 g) and 2-hydroxy-3-(methacryloyloxy)propyl trimethyl ammonium chloride (QMA) (19.6 g) were dissolved in ethanol (180 g) and placed in a four-necked flask and nitrogen was sparged through the mixture for 30 minutes. Azobisisobutyronitrile (0.85 g) was added at 50° C. and the mixture was allowed to polymerize for 8 hours. The polymerization liquid was added dropwise to three liter of diethylether under stirring and the resulting precipitate was filtered and dried for 48 hours at room temperature under vacuum to obtain a powder. The powder was analyzed by GPC to find a weight average molecular weight of 900,000. The powder is referred to as MPC1.

(Synthetic Example 2) (MPC2: MPC0.5-QMA0.5)

The same method was employed as Synthetic Example 1 except that 15.2 g of MPC and 12.9 g of QMA were used to conduct polymerization to obtain a powder. The powder was analyzed by GPC to find a weight average molecular weight of 820,000. The powder is referred to as MPC2.

(Synthetic Example 3) (MPC3: MPC0.7-QMA0.3)

The same method was employed as Synthetic Example 1 except that 19.3 g of MPC and 7.1 g of QMA were used to conduct polymerization to obtain a powder. The powder was analyzed by GPC to find a weight average molecular weight of 750,000. The powder is referred to as MPC3.

(Synthetic Example 4) (MPC4: MPC0.9-QMA0.1)

The same method was employed as Synthetic Example 1 except that 25.1 g of MPC and 2.4 g of QMA were used to conduct polymerization to obtain a powder. The powder was analyzed by GPC to find a weight average molecular weight of 650,000. The powder is referred to as MPC4.

(Synthetic Example 5) (MPC5: MPC0.95-QMA0.05)

The same method was employed as Synthetic Example 1 except that 26.5 g of MPC and 1.2 g of QMA were used to conduct polymerization to obtain a powder. The powder was analyzed by GPC to find a weight average molecular weight of 620,000. The powder is referred to as MPC5.

TABLE 1

| Composition of water-retaining macromolecule polymer | Weight average molecular weight |
| --- | --- |
| MPC1 (MPC0.3-QMA0.7) | 900,000 |
| MPC2 (MPC0.5-QMA0.5) | 820,000 |
| MPC3 (MPC0.7-QMA0.3) | 750,000 |
| MPC4 (MPC0.9-QMA0.1) | 650,000 |
| MPC5 (MPC0.95-QMA0.05) | 620,000 |

The values in the parenthesis show the molar ratio.

Examples 1 to 5

The water-retaining macromolecule polymer shown in Table 1 (0.5-1.0 parts by weight), three types of mold-preventing agents (13 parts by weight of imidazole-based mold-preventing agent, 26 parts by weight of pyridine-based mold-preventing agent, and 10.5 parts by weight of isothiazoline-based mold-preventing agent), a permeation agent (1 part by weight), an acrylic resin (manufactured by Toyo Ink Co. Ltd.) (50 parts by weight) were dispersed in water to prepare a solution of a mold-preventing composition (solid concentration: 5 wt %).

A nonwoven fabric (fabric weight: 60 g/m$^2$) composed of 15% of polyester fiber, 35% of polyvinyl alcohol fiber, and 50% of acrylic binder was immersed in the above-mentioned solution of a mold-preventing composition for two seconds and dried at 150° C. for 70 seconds to prepare a reinforcing nonwoven fabric (a backing material) loaded with the mold-preventing composition at 4 g/m$^2$.

The above-mentioned reinforcing nonwoven fabric (a backing material) was scattered with EVA (ethylene vinyl acetate copolymer) powder at 10 g/m$^2$, on which an electret polypropylene melt blown nonwoven fabric (fabric weight: 20 g/m$^2$) was applied. The two nonwoven fabrics were bonded together by contact bonding under heating at 130° C. to prepare a mold-preventing air filter filtration medium.

Comparative Example 1

The same procedure was followed as Example 1 except that the water-retaining macromolecule polymer was not added to the mold-preventing composition to prepare a mold-preventing air filter filtration medium.

Comparative Example 2

The same procedure was followed as Example 1 except that the mold-preventing agent was not added to the mold-preventing composition to prepare a mold-preventing air filter filtration medium.

Comparative Example 3

The same procedure was followed as Example 1 except that the water-retaining macromolecule polymer and the mold-preventing agent were not added to the mold-preventing composition to prepare a mold-preventing air filter filtration medium.

and a filter test piece was applied in the center. The medium was cultured at 25° C. for two weeks. After the culture, the size of a growth-inhibitory zone around the filter test piece was measured.

Figure 4:
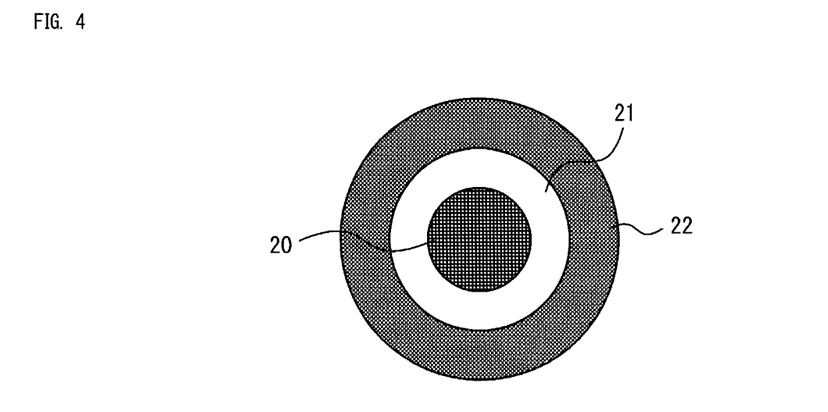
FIG. 4 is a view illustrating a laboratory test.

FIG. 4 illustrates a PDA medium, wherein 20 shows a filter test piece, 21 shows a growth-inhibitory zone where the growth of microorganisms is inhibited by the mold-preventing agent dissolved from the test piece, and 22 shows an area where microorganisms grow due to the nutrients in the medium.

The results of the above-mentioned tests are shown in Table 2.

TABLE 2

| | Mold-preventing composition | | | | Laboratory test | |
|---|---|---|---|---|---|---|
| | Water-retaining macromolecule polymer | | Mold-preventing agent | | Size of growth-inhibitory zone | |
| No. | Type | Blending amount (wt %) | Blending amount (wt %) | Field test Number of fungi (unit: cfu/g) | unit: mm | Effect |
| Example 1 | MPC1 | 0.07 | 2.78 | $6.8 \times 10^2$ | 58 | Present |
| Example 2 | MPC2 | 0.07 | 2.78 | $3.1 \times 10^2$ | 60 | Present |
| Example 3 | MPC3 | 0.07 | 2.78 | $6.2 \times 10^1$ | 60 | Present |
| Example 4 | MPC4 | 0.07 | 2.78 | $1.2 \times 10^2$ | 59 | Present |
| Example 5 | MPC5 | 0.07 | 2.78 | $4.5 \times 10^2$ | 60 | Present |
| Comparative Example 1 | — | — | 2.82 | $3.1 \times 10^4$ | 61 | Present |
| Comparative Example 2 | MPC1 | 0.15 | — | $2.2 \times 10^6$ | 0 | Absent |
| Comparative Example 3 | — | — | — | $4.5 \times 10^5$ | 0 | Absent |

Testing Example 1: Field Test

The mold-preventing air filter filtration medium prepared in Examples and Comparative Examples was fixed to an aluminum frame (610×610×65 mm) with an olefin-based hot melt sealing agent to prepare a filter unit.

The filter unit was installed as an air introducing filter of a bread factory and used for 90 days, after which a test for detecting microorganisms was conducted. The backing material was removed and a sterilized cotton swab was used to collect the dust attached to the surface of the filter material, and the weight of the dust and the number of microorganisms in the dust were measured (the average temperature: 27° C.; the average humidity: 68% in the measurement environment).

Figure 3:
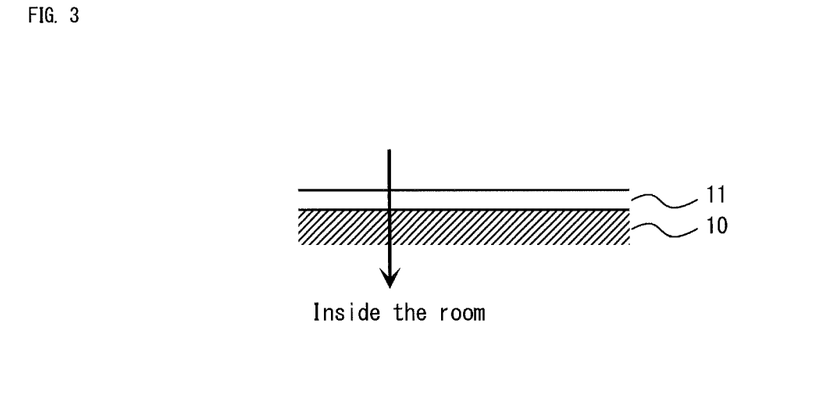
FIG. 3 is a view illustrating a field test.

FIG. 3 is a view illustrating a field test, wherein 10 is a filter and 11 is dust.

Testing Example 2: Laboratory Test

*Aspergillus* sp., *Cladosporiumu* sp., *Penicillium* sp., and *Aitemaria* sp. were added to sterile purified water at $10^5$ cfu/ml and the four kinds were mixed to prepare a fungus liquid. The fungus liquid was smeared on a PDA medium Table 2 shows that the mold-preventing air filter filtration medium of the Examples loaded with the water-retaining macromolecule polymer and the mold-preventing agent had a fewer number of microorganisms in the dust and a larger growth-inhibitory zone than the filter medium of Comparative Examples 2-3 where the mold-preventing agent was not contained. In addition, it can be seen that the filtration medium of Comparative Example 1 loaded with the mold-preventing agent only had a comparable size of the growth-inhibitory zone to the filtration medium of the Examples, but had a larger number of microorganisms in the field test.

It can be seen that the mold-preventing air filter filtration medium of the present invention (Examples) loaded with the water-retaining macromolecule polymer and the mold-preventing agent had ten to one thousand fewer microorganisms compared with the conventional filtration medium loaded with the mold-preventing agent only, showing superior mold-preventing effect.

INDUSTRIAL APPLICABILITY

According to the present invention, a mold-preventing air filter that kills mold and bacteria captured with dust and cleanses the air is provided by using the mold-preventing air filter filtration medium as a prefilter by placing upstream to the filter material or as a medium performance air filter. The mold-preventing air filter can be suitably used as a filter of an air conditioner in hospitals, food factories, or restaurant kitchens.

EXPLANATION OF THE REFERENCE NUMERICALS

1. Mold-preventing air filter filtration medium
2. Reinforcing nonwoven fabric
3. Filter material
4. String or ribbon separator
5. Frame (Frame body)
6. Gasket

The invention claimed is:

1. A mold-preventing air filter filtration medium,
   wherein the filtration medium is loaded with a water-retaining macromolecule polymer, a mold-preventing agent and a binder resin, and
   wherein the water-retaining macromolecule polymer is a copolymer of a phosphorylcholine-like group containing monomer and a hydrophilic monomer having at least one trialkylamino base,
   wherein the water-retaining macromolecule polymer and the mold-preventing agent are combined in a solid weight ratio of 1:10-500, and
   wherein the phosphorylcholine-like group containing monomer is represented by the following formula (1)

[Formula 1]

(1)

wherein X represents a divalent organic residue,
wherein Y represents an alkyleneoxy group having 1-6 carbon atoms,
wherein Z represents a hydrogen atom or R5-O—(C=O)—
wherein R5 represents an alkyl group having 1-10 carbon atoms or a hydroxyalkyl group having 1-10 carbon atoms,
wherein R1 represents a hydrogen atom or a methyl group,
wherein R2, R3, and R4 are the same or different, and represent a hydrogen atom or an alkyl or hydroxyalkyl group having 1-6 carbon atoms,
wherein m represents 0 or 1, and
wherein n is an integer of 1-4.

2. The mold-preventing air filter filtration medium according to claim 1, wherein the filtration medium is formed by bonding a reinforcing nonwoven fabric loaded with the water-retaining macromolecule polymer, the mold-preventing agent and the binder resin to a filter material.

3. The mold-preventing air filter filtration medium according to claim 1, wherein the mold-preventing agent and the binder resin are combined in a solid weight ratio of 1:0.5-10.

4. The mold-preventing air filter filtration medium according to claim 1, wherein the phosphorylcholine-like group containing monomer comprises 2-(meth)acryloyloxyethyl-2'-(trimethyl ammonio)ethyl phosphate.

5. The mold-preventing air filter filtration medium according to claim 1, wherein the hydrophilic monomer comprising the trialkylamino base is 2-hydroxy-3-(meth)acryloyloxypropyl trimethyl ammonium chloride.

6. The mold-preventing air filter filtration medium according to claim 1, wherein the binder resin is an acrylic resin.

7. A mold-preventing air filter comprising:
   a pleated filtration medium formed by pleating the mold-preventing air filter filtration medium according to claim 1; and
   a frame for accommodating the pleated filtration medium.

8. The mold-preventing air filter filtration medium according to claim 4, wherein the hydrophilic monomer comprising the trialkylamino base is 2-hydroxy-3-(meth)acryloyloxypropyl trimethyl ammonium chloride.

* * * * *